US010390388B2

(12) United States Patent
Kotzian et al.

(10) Patent No.: US 10,390,388 B2
(45) Date of Patent: Aug. 20, 2019

(54) MICROWAVE HEATING SYSTEM (71) Applicant: Anton Paar GmbH, Graz (AT)

(72) Inventors: Heimo Kotzian, Graz (AT); Rainer Zentner, Graz (AT); Johannes Zach, St. Marein bei Graz (AT); Elisabeth Gangl, Graz (AT)

(73) Assignee: Anton Paar GmbH, Graz (AT)

( * ) Notice: Subject to any disclaimer, the term of this patent is extended or adjusted under 35 U.S.C. 154(b) by 683 days.

(21) Appl. No.: 14/498,721

(22) Filed: Sep. 26, 2014

(65) Prior Publication Data

US 2015/0090710 A1 Apr. 2, 2015

(30) Foreign Application Priority Data

Sep. 27, 2013 (EP) .................................. 13186490

(51) Int. Cl.
*H05B 6/80* (2006.01)
*H05B 6/64* (2006.01)
*H05B 6/70* (2006.01)
*B01J 19/12* (2006.01)

(52) U.S. Cl.
CPC ............ *H05B 6/806* (2013.01); *B01J 19/126* (2013.01); *H05B 6/6402* (2013.01); *H05B 6/6411* (2013.01); *H05B 6/707* (2013.01); *B01J 2219/126* (2013.01); *B01J 2219/1218* (2013.01); *B01J 2219/1227* (2013.01); *B01J 2219/1233* (2013.01); *B01J 2219/1257* (2013.01);
(Continued)

(58) Field of Classification Search
CPC .......... H05B 7/20; H05B 7/144; H05B 7/152; F27B 3/085; F27B 3/28; F27D 11/08

USPC ....... 219/678, 690, 745, 748, 749, 750, 752, 219/753, 754, 756, 704, 710; 422/21, 50, 422/500, 566, 198
See application file for complete search history.

(56) References Cited

U.S. PATENT DOCUMENTS 4,163,141 A * 7/1979 Tanaka ................. H05B 6/6411
219/754
5,206,479 A * 4/1993 Zakaria ................. B01J 19/126
219/726
(Continued)

FOREIGN PATENT DOCUMENTS

DE 29712866 U1 3/1999
EP 0564359 A1 6/1993
(Continued)

*Primary Examiner* — Ibrahime A Abraham
*Assistant Examiner* — Justin C Dodson
(74) *Attorney, Agent, or Firm* — Robert A. Blaha; Smith Tempel Blaha LLC (57) ABSTRACT

A microwave heating system comprises a bowl, dome and rotor device. The dome is fit to the bowl. The bowl and dome form a volume. The bowl is connected to a microwave source such that a microwave field is supplied to the volume. The microwave field is attenuated in a region between the rotor device and the dome compared to a region between the bowl and the rotor device. The rotor device is rotatably supported by the bowl and supports a reaction vessel. The rotor device includes a base plate with a through-hole and a tubular member that receives the reaction vessel. The base plate and tubular member are metal. The rotor device is coupled to the base plate so that a longitudinal axis of the tubular member passes through the through-hole.

20 Claims, 4 Drawing Sheets

(52) U.S. Cl.
CPC .................... *B01J 2219/1266* (2013.01);
*B01J 2219/1272* (2013.01)

(56) References Cited

U.S. PATENT DOCUMENTS

| | | | | |
|---|---|---|---|---|
| 5,280,150 | A * | 1/1994 | Arai | A21B 2/00 |
| | | | | 219/726 |
| 6,097,015 | A * | 8/2000 | McCullough | A61L 2/12 |
| | | | | 219/686 |
| 6,147,336 | A * | 11/2000 | Ushijima | H05B 6/129 |
| | | | | 219/601 |
| 6,956,191 | B2 * | 10/2005 | Han | H05B 6/6414 |
| | | | | 126/190 |
| 2003/0047559 | A1 * | 3/2003 | Watanabe | H05B 6/6455 |
| | | | | 219/711 |
| 2004/0069776 | A1 | 4/2004 | Fagrell et al. | |
| 2007/0215607 | A1 * | 9/2007 | Wander | H01L 21/67103 |
| | | | | 219/678 |
| 2008/0078757 | A1 * | 4/2008 | Lang | H05B 6/806 |
| | | | | 219/679 |
| 2010/0206872 | A1 * | 8/2010 | Matsuzawa | H05B 6/806 |
| | | | | 219/687 |
| 2010/0270291 | A1 * | 10/2010 | Kotzian | H05B 6/701 |
| | | | | 219/690 |

FOREIGN PATENT DOCUMENTS

| | | |
|---|---|---|
| EP | 2244529 A1 | 10/2010 |
| JP | S61184332 A | 8/1986 |
| WO | WO99/17588 A1 | 4/1999 |
| WO | WO00/36880 A2 | 6/2000 |
| WO | WO2011097716 A1 | 8/2011 |

* cited by examiner

MICROWAVE HEATING SYSTEM

CROSS REFERENCE TO RELATED APPLICATION

This application claims the benefit of the filing date of European Patent Application No. 13186490, filed Sep. 27, 2013, the disclosure of which is hereby incorporated herein by reference.

TECHNICAL FIELD

The present invention relates to the field of microwave-assisted chemistry, such as digestion and synthesis. Particularly, the present invention relates to microwave heating systems.

TECHNOLOGICAL BACKGROUND

In microwave-assisted chemistry, microwave energy is used to increase temperature in chemical synthesis, chemical analysis and similar processes. Thereby, known chemical reactions and processes can be accelerated, the yield can be increased, and the purity of the products can be improved. However, the large amount of energy, which is applied to the samples in microwave-assisted chemistry, also enables completely new syntheses and reactions.

Many devices and methods for microwave-assisted chemistry are based on household microwave ovens and operate at frequencies around 915 MHz or 2.45 GHz. Standing waves of different longitudinal and transversal modes of the microwave field are super-positioned within the cavity of such ovens. Therefore, the spatial energy distribution is non-homogeneous and exhibits so-called "hot spots" and "cold spots". Examples of such classical multi-mode microwave heating systems are e.g. Anton Paar "Multiwave 3000", CEM Mars Express, and Milestone "Ethos".

Microwave transparent reaction vessels are arranged in microwave transparent vessel carriers and positioned within the microwave oven which is flushed with microwaves. Due to the non-uniform energy distribution, it is customary to place the reaction vessels on a rotatable support structure, such as a turn table. By rotating the support structure during heating, the level of applied energy to the samples may be evened out. It is furthermore known to implement mechanisms for stirring the samples and to change the superpositioned modes within the cavity, i.e. so-called modemixing. Single mode devices may be used for small sample amounts.

The large pressure and temperature that may occur in the reaction vessels during sample heating in a multi-mode device require the use of expensive materials for the interior structure of the heating devices which can resist the impact of a sample leaking from a broken vessel. Installation of temperature and pressure sensors is a complicated task due to the need for protecting such sensors against microwave radiation. Furthermore, care has to be taken as regards material and geometry of the sensor components in order to assure that these do not heat up and/or cause sparks when subjected to microwave radiation.

Also the reaction vessels are designed to withstand the pressure and temperature occurring during sample heating. The reaction vessels are thermally decoupled from the microwave transparent vessel carriers. Thus, a non-uniform microwave heating of each sample may occur, which may cause insufficient temperature homogeneity in the samples and thereby insufficient reproducibility of the conditions within the particular vessels.

In microwave reactors, microwave transparent reaction vessels (supported by microwave transparent sample carriers or rotors comprising separate carrier positions) are positioned in a metallic pressure-container which is then pressurized with nitrogen. This causes sealing of the reaction vessels which are provided with loose plugs. Thereafter, microwave is fed to the container. Thus, the cavity of a microwave reactor must be gas-proof, and a nitrogen source must be provided. Further, air cooling is inefficient and automatic ventilation is not possible. Due to the high nitrogen consumption and the need for cost-effectiveness, the volume of microwave reactor cavities tends to be kept down, such that the number and size of sample vessels which fit into the reactor is limited.

The samples which are to be heated may have different permittivities and the permittivities may also change during heating. Differing filling levels of the inserted vessels may further modify the microwave propagation conditions within the cavity and thereby change the energy distribution within the cavity. WO 99/17588 A1 describes a complex way of dealing with this problem. Single-mode systems with only a single sample vessel carrier are described in US 2004/0069776 A1 and EP 2 244 529 A1. Systems with individual feeding of microwave to multiple sample carriers are described in WO 00/36880 A2 and in WO 2011/097116 A1.

There may be a need for a simple and inexpensive microwave-assisted chemistry heating system without the above-mentioned drawbacks. In particular, there may be a need for a microwave heating system with reduced dead volume and improved homogeneity of sample heating.

SUMMARY

This need may be met by the subject-matter according to the independent claim. Advantageous exemplary embodiments of the present invention are set forth in the dependent claims.

According to an exemplary embodiment of the present invention, there is provided a microwave heating system. The described system comprises (a) a bowl, (b) a dome adapted to be fit to the bowl, such that a volume is formed by the bowl and dome, and (c) a rotor device adapted to support at least one reaction vessel and being rotatably supported by the bowl, the rotor device comprising (c1) a base plate comprising at least one through-hole, and (c2) at least one tubular member having a longitudinal axis and being adapted to receive a reaction vessel and to be coupled to the base plate in such a way that the longitudinal axis of the at least one tubular member passes through the at least one through-hole, wherein the base plate and the at least one tubular member comprise metal, and wherein the bowl is adapted to be connected to a microwave source, such that a microwave field can be supplied to the volume, whereby the microwave field is attenuated in a region between the rotor device and the dome compared to a region between the bowl and the rotor device.

The present invention is based on the idea that a metallic rotor device may attenuate the microwave field in a region between the rotor device and the dome such that the field intensity in this region is substantially reduced in comparison to a region between the bowl and the rotor device. Thereby, the microwave field within the volume formed by the bowl and the dome is divided into regions of low and high intensity. By arranging the samples to be heated such that at least a part of each sample extends into the region of high field intensity, heating of the samples can be achieved. The region of low field intensity may be equipped with microwave sensitive equipment, such as temperature and pressure sensors, without the need for expensive protection structures. Furthermore, the metallic tubular members provide pressure protection for the reaction vessels, thereby obviating or at least reducing the need for vessels with expensive pressure shells. Yet further, the metallic tubular members provide thermal coupling which improves the homogeneity of the sample temperature within several reaction vessels.

In the present context, the term "bowl" may particularly denote an open-top container structure which is suitable for forming a lower part of a two-part closed container.

In the present context, the term "dome" may particularly denote an open-bottom container structure which is suitable for forming an upper part of a two-part closed container.

The bowl and dome are preferably made of metal and may have identical, similar or different shapes and sizes, but in any case they have matching borders in terms of shape and size such that when the dome is fitted on top of the bowl, a closed volume is formed.

In the present context, the term "rotor device" may particularly denote a device adapted to hold at least one reaction vessel and to move such a vessel along a plane trajectory when the rotor device is rotated.

In the present context, the term "base plate" may particularly denote a substantially flat structure having a significantly larger width than thickness. The base plate preferably comprises two opposing main sides, such as an upper flat surface and a lower flat surface, and an edge extending circumferentially along an outer periphery of the base plate. The base plate may preferably have a substantially circular cross-sectional shape in which case the base plate is disc-shaped. However, other cross-sectional shapes, such as substantially triangular, quadratic or elliptical, may also be used.

In the present context, the term "tubular member" may particularly denote an elongate cylindrical member, such as a section of a tube. The tubular member may preferably have a circular cross-section such that an inserted reaction vessel may fit snuggly within the tubular member.

The tubular member is coupled to the base plate such that the longitudinal axis of the tubular member is substantially perpendicular to the plane of the base plate and such that at least a part of the opening of the tubular member overlaps at least a part of the through-hole of the base plate. Thereby, when a reaction vessel is positioned in the tubular member, an end portion of such reaction vessel may extend into or even through the through-hole of the base plate and into the region of high field intensity. In this case, the part of the end portion of the reaction vessel which extends through the base plate may, due to the dielectric properties of the reaction vessel and the sample contained therein, act as a microwave antenna such that microwave radiation can propagate into the reaction vessel.

The metallic tubular member may act as an outer reinforcement of the reaction vessel, which reduces the risk that the reaction vessel bursts due to high pressure during heating of a sample contained within the vessel.

The metal may preferably be chosen so as to exhibit excellent thermal conduction properties. Thereby, non-uniform heating of a sample in a reaction vessel may be evened out such that the uniformity of the sample temperature can be improved. Thereby, the risk of a vessel bursting or leaking due to extreme heat in a limited area of the vessel can also be reduced.

Accordingly, the described device may obviate the need for complicated multi-layer pressure reaction vessels and thereby provide a significant cost reduction. Furthermore, the device may significantly enhance the uniformity of sample temperature within the reaction vessel during heating.

According to a further exemplary embodiment, the bowl and the dome have rotationally symmetric shapes.

The bowl and dome may in particular have circular borders and may preferably be produced from metal plates or sheets by e.g. deep drawing, metal spinning or hydroforming.

According to a further exemplary embodiment, the dome is moveably fastened to the bowl.

In the present context, the term "moveably fastened" may in particular denote that the dome is fastened to the bowl in such a way that it is still possible to move the dome to a certain amount relative to the bowl. This may e.g. be achieved by fastening the dome to the bowl by a hinge which allows the dome to pivot about an axis extending in parallel with a tangent of the border of the bowl.

According to a further exemplary embodiment, the system further comprises a drive unit for rotating the rotor device.

In particular, the drive unit may comprise an electric motor which is arranged to rotate the rotor device. The rotation preferably takes place in a horizontal plane.

According to a further exemplary embodiment, the system further comprises a sensor unit arranged in the region between the rotor device and the dome.

According to a further exemplary embodiment, the system further comprises contactless e.g. optically sensor unit arranged outside the bowl or dome. The optical sensor may exhibit a transmission window within the bowl or dome.

The sensor unit may comprise sensors for measuring pressure and/or temperature and/or further physical or chemical parameters within the volume formed by the dome and bowl.

The sensor unit may comprise sensors for measuring pressure and/or temperature and/or further physical or chemical parameters within the reaction vessel.

According to a further exemplary embodiment, the rotor device further comprises a support element arranged at one side of the base plate and comprising a microwave transparent material.

The support element may preferably be configured to support an end portion of a reaction vessel residing in the tubular member such that the reaction vessel is held in a desired position relative to the tubular member. This may for example be achieved by providing the support element with an opening having a somewhat smaller diameter than the inner diameter of the tubular member, such that only a tip of the end portion may fit into the opening in the support element. As another example, the support element may comprise a cut-out portion or a recess shaped to receive and support the end portion of the reaction vessel.

The support element may preferably be arranged on a main surface of the base plate such that the support element covers a part of or the entire main surface. This main surface is the surface facing the volume with the high field intensities. In particular, the support element may be formed as a layer on the base plate.

Thereby, when the base plate is arranged within a microwave heating apparatus such that the base plate is substantially parallel with a bottom of the microwave heating apparatus, the lower end portion of the reaction vessel may be surrounded by or even extend partially through the microwave transparent material of the support element. Accordingly, even if the microwave radiation is strongly attenuated within the tubular member, at least the lower end portion of the reaction vessel will extend into the region of strong microwave field intensity and may thus catch microwave radiation and guide it into the rest of the reaction vessel when the vessel contains a dielectric sample that allows microwave propagation within the tubular member.

According to a further exemplary embodiment, the at least one tubular member is arranged on the side of the base plate opposite to the side at which the support element is arranged.

In this exemplary embodiment, the reaction vessel residing within the tubular member extends through the through-hole in the base plate such that the end portion of the reaction vessel is supported by the support element.

According to a further exemplary embodiment, the base plate and the at least one tubular member are integrally formed.

In this exemplary embodiment, the base plate also comprises metal and the tubular member is coupled to the base plate e.g. by welding or soldering. Here, it is important to provide electrical contact between the tubular member and the base plate in order to reduce the risk of sparks when the device is exposed to microwave radiation.

According to a exemplary further embodiment, the metal comprises aluminum, stainless steel and/or a nickel-based alloy.

Examples of useful nickel-based alloys are e.g. the range of nickel-chromium based alloys (e.g. Inconel®) which further to the main components (Ni and Cr) may comprise one or more of the following elements: Mb, Fe, Nb, Co, Mn, Cu, Al, Ti, Si, C, S, P, B. Inconel® is the registered trademark of Huntington Alloys Corporation of Huntington, W.Va., U.S.A.

The above mentioned metals and alloys have excellent resistance to elevated temperatures, oxidation and corrosion. Furthermore, they are stable, strong, ductile, and relatively inexpensive in comparison to complex synthetic and composite materials.

According to a further exemplary embodiment, the base plate and/or the at least one tubular member comprise an anticorrosive coating.

The anticorrosive coating may preferably be a Fluoropolymer coating (e.g. PFA, FEP, Teflon®) which protects the base plate and/or tubular member against corrosion as well as the impacts of heated sample material accidentally leaking from the reaction vessel. Teflon® is the registered trademark of E. I. Du Pont DE Nemours and Company of Wilmington, Del., U.S.A.

According to a further exemplary embodiment, the at least one tubular member is adapted to attenuate microwave propagation within the tubular member.

This may e.g. be achieved by selecting the length and diameter of the tubular member relative to the frequency of the microwave radiation which is supplied by the microwave source.

The attenuation $\alpha$ (in dB) of microwave radiation at a given wavelength $\lambda$ depends on the diameter D and length L of the tubular member and is given by the formula:

$$\alpha = L*8.69[(2*\pi/\lambda_c)^2 - Er*(2*\pi/\lambda_o)^2]^{1/2}$$

where $\lambda_c$ is the cut-off wavelength (=1.706*D), Er is the dielectric constant of the medium within the tubular member, $\lambda_o$ is the Freespace Wavelength (=c/f), c is the speed of light, and f is the frequency (e.g. 2.45 GHz).

It is noted that in the present context, "attenuate microwave propagation within the tubular member" refers to the situation where no dielectric sample substance is present (in a reaction vessel) within the tubular member, i.e. the case where the relative dielectric constant Er within the tubular member is substantially 1 (one).

Thereby, the strength of the microwave radiation in a region opposite to the microwave source (relative to the rotor device) within the volume delimited by the bowl and dome may be attenuated in comparison to a region close to the source. In other words, if the microwave radiation is supplied through an opening in the lower part of the bowl, the strength of the microwave field in the upper part (above the rotor device) may be attenuated in comparison to the case where the device is not present in the heating apparatus. This effect is further intensified by the base plate which comprises metal and thus prohibits microwave propagation.

The region above the rotor device can thus (as mentioned above) be used to install e.g. measurement equipment, such as temperature and pressure sensors, without the need (or at least a significantly reduced need) for expensive and complicated protection measures.

According to a further exemplary embodiment, the diameter of the at least one tubular member is between 10 mm and 50 mm, such as between 20 mm and 40 mm, such as between 25 mm and 35 mm, such as between 25 mm and 30 mm. The at least one tubular member is designed to the desired volume of the vessel (typically 5-100 ml) and appropriate attenuation.

According to a further exemplary embodiment, the at least one through-hole is a plurality of through-holes, the at least one tubular member is a plurality of tubular members, and the longitudinal axis of each tubular member passes through one of the plurality of through-holes.

In other words: The base plate comprises a plurality of through-holes, and each of a plurality of tubular members is coupled to the base plate in such a way that at least a part of the opening of each tubular member overlaps at least a part of a corresponding through-hole in the base plate.

The features of the above mentioned exemplary embodiments apply equally to the plurality of tubular members and through holes of this exemplary embodiment.

Accordingly, the present exemplary embodiment is capable of supporting a plurality of reaction vessels. Furthermore, the metallic base plate may even provide balancing or equalizing of sample temperature among different vessels.

According to a further exemplary embodiment, the plurality of through-holes comprises a first group of through-holes which are positioned in the vicinity of a periphery of the base plate.

The first group of through holes may comprise one through hole, two or more through holes or even all the through holes of the plurality of through holes.

The first group of through holes may preferably be arranged with constant spacing or pitch on a circle.

According to a further exemplary embodiment, the plurality of through-holes comprises a second group of through-holes which are positioned at a predetermined distance between a center of the base plate and the periphery of the base plate.

The second group of through holes may preferably be arranged with constant spacing or pitch on a circle having a smaller diameter than the circle on which the first group of through holes is arranged.

Thereby, the use of the surface area of the base plate can be maximized such that the use of space within the microwave heating apparatus is optimized.

According to a further exemplary embodiment, the parts of each reaction vessel extending below the base plate and into a cut-out portion of the microwave transparent support element may vary according to their position on the circles to even out different microwave absorption of the different circles.

According to a further exemplary embodiment, the system further comprises a reaction vessel having a tubular body, wherein an outer portion of the tubular body has a tooth profile.

In the present context, the term "an outer portion of the tubular body has a toothed profile" may in particular denote that the outer surface of a portion of (or the entire) tubular body is provided with elements that protrude radially from the tubular body such that the tubular body becomes a profile looking like a toothed wheel. The protruding elements may preferably be constituted as ribs extending in the longitudinal direction of the tubular body and may preferably have a square, rectangular, triangular or rounded cross-sectional shape.

When the reaction vessel is inserted into a tubular element of the rotor device, the toothed profile causes forming of canals between the teeth (protruding elements), which allow air or another gas to flow along the outer surface of the tubular body. Thereby, cooling of a hot sample contained in the reaction vessel can be assisted.

The reaction vessel may further comprise a plug and/or screw cap for closing the reaction vessel at an open (upper) end of the tubular body. The reaction vessel, including the tubular body, plug and screw cap, is preferably made of glass, Fluoropolymer, ceramics, SiC, SiN, $Al_2O_3$ etc. depending on the type of reaction and solvent.

The reaction vessel may preferably have a diameter between 10 mm and 50 mm, such as between 20 mm and 40 mm, such as between 25 mm and 35 mm. The ratio between diameter and length of the tubular body of the reaction vessel may preferably be between 1:3 and 1:8, such as around 1:3, around 1:4, around 1:5, around 1:6 around 1:7, or around 1:8. A reaction vessel having a diameter around 10 mm may preferably have a sample volume around 10 ml. A reaction vessel having a diameter around 30 mm may preferably have a sample volume around 50 ml. A reaction vessel having a diameter around 50 mm may preferably have a sample volume around 100 ml.

Aspects of the present invention are apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION OF EXEMPLARY EMBODIMENTS

The illustration in the drawing is schematic. It is noted that in different figures, similar or identical elements are provided with the same reference signs or with reference signs, which differ only within the first digit.

Figure 1:
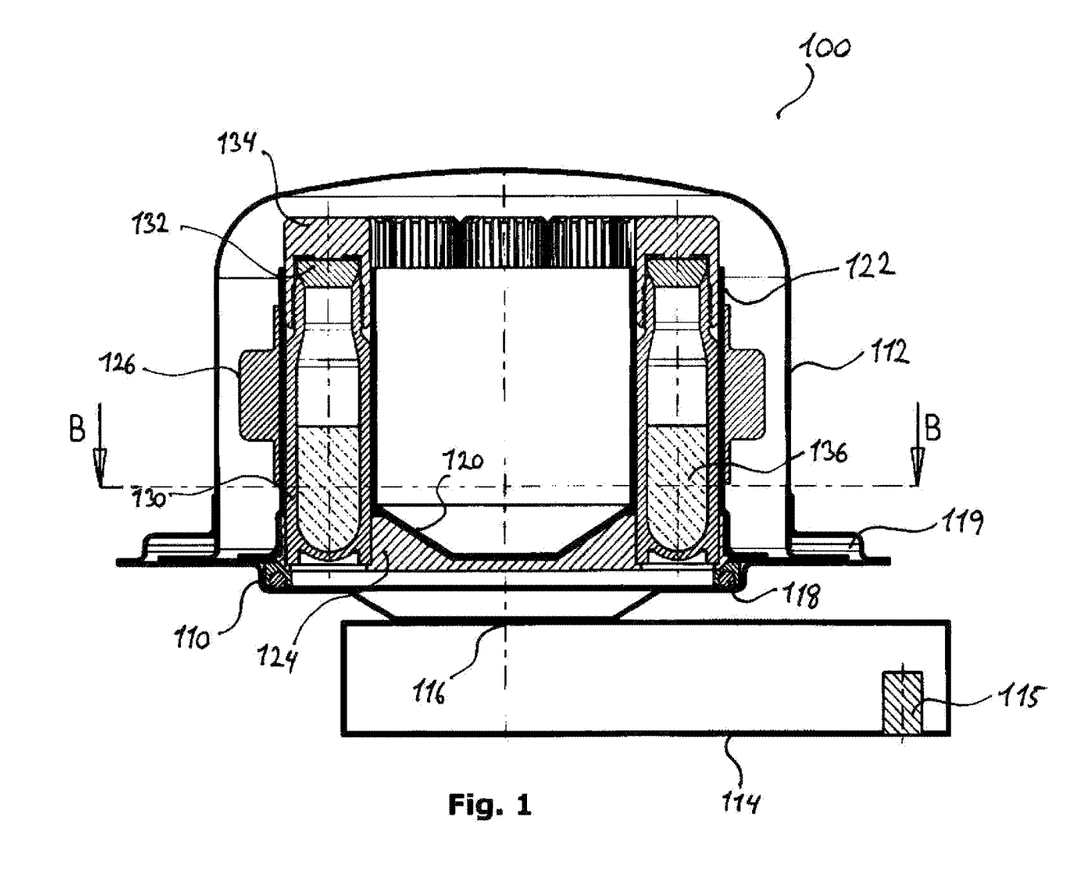
FIG. 1 shows a side sectional view of a system according to an exemplary embodiment.

FIG. 1 shows a side sectional view of a microwave heating system 100 according to an exemplary embodiment. The system 100 comprises a bowl 110 and a dome 112 which together form a cavity or inner volume of the system 100. A rectangular waveguide 114 is connected to a bottom part of the bowl 110 via coupling opening 116. In the other end of the waveguide 114, there is arranged a magnetron antenna 115 for supplying a microwave field. The system can be opened by pivoting or displacing the dome 112 relative to the bowl 110. The dome 112 comprises a choke 119 which acts as a "microwave trap" to prevent microwave radiation from escaping from the volume defined by the bowl 110 and dome 112. Within this volume, a metallic rotor is arranged such that it can be rotated by drive 118.

The metallic rotor comprises a base plate 120 and a plurality of tubular members 122. The sectional view in FIG. 1 shows two of these tubular members 122 in detail. The tubular members 122 are coupled to the base plate 120 such that the respective longitudinal axes of the tubular members 122 are substantially perpendicular to the plane of the base plate 120 and such that at least a part of each respective opening of the tubular members 122 overlaps at least a part of a corresponding through-hole (see FIG. 2) of the base plate 120. The rotor further comprises a microwave transparent support element 124 on the side of the baseplate 120 which faces the bowl 110. On the radially outer side of the rotor, a handle 126 extending along the entire circumference is provided for facilitating insertion and removal of the rotor from the system. Within the tubular members 122, reaction vessels 130 are arranged. The vessels 130 are closed by respective plugs 132 and screw caps 134 and each vessel 130 contains a sample 136. At least a part of each reaction vessel 130 extends below the base plate 120 and into a cut-out portion of the microwave transparent support element 124.

Figure 4:
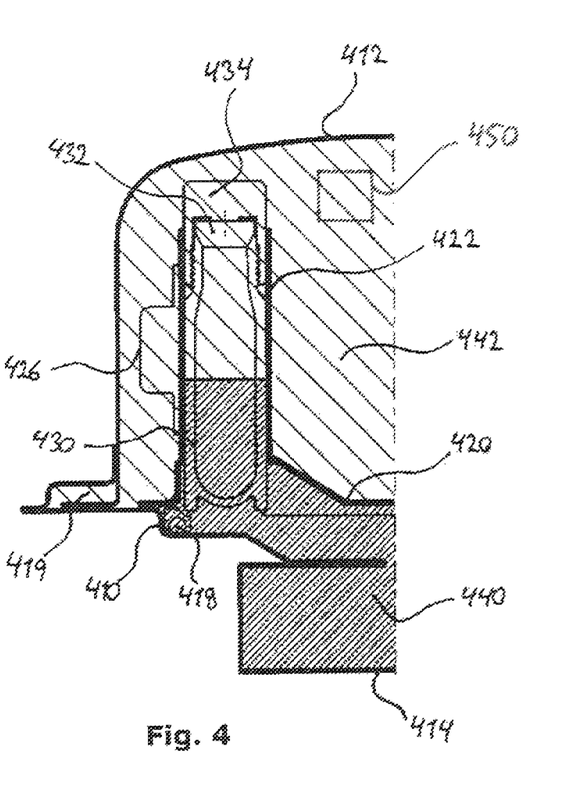
FIG. 4 shows an illustration of the distribution of microwave field intensity within the system shown in FIGS. 1 to 3.

In operation, the rotor with the reaction vessels 130 will be rotated by the drive 118 while microwave energy is supplied through the coupling opening 116. Drive 118 is not shown in detail, e.g. a motor may rotate a gearwheel sitting on its drive shaft interlocking with a structure 118 circumferential to the rotor. The part of the samples 136 which is below the base plate 120 and which is not surrounded by the tubular elements 122 will absorb microwave energy. Furthermore, due to the dielectric characteristics of the sample 136, microwave energy will propagate (with some attenuation) into the part of the sample contained within the tubular members 122, such that the entire sample 136 is heated. In the upper part of the reaction vessels 130, where no sample 136 is present, the microwave field will be strongly attenuated such that the intensity of the field within the volume above the base plate 120 will only be a fraction of the intensity below the base plate 120. This allows for installation of e.g. pressure and temperature sensors in the upper part of the system without extensive and expensive shielding structures. A corresponding sensor unit 450 is schematically shown in FIG. 4.

The metallic tubular members 122 will act as reinforcements against radial forces caused by high pressure within the reaction vessels 130. Furthermore, the metallic tubular members 122 will distribute thermal energy such that the sample will be homogenously heated. Furthermore, due to the attenuation of the microwave field in the direction towards the plug 132, sample particles that may adhere to the inner wall of the upper part of the reaction vessels 130 will only receive a reduced amount of microwave energy and therefore not so easily cause damage to the vessels 130 by local overheating.

As the dielectric characteristics of the sample 136 in each reaction vessel 130 will allow microwave propagation into the sample, the heating of the samples 136 will occur more homogenously even if the amount of sample 136 in the vessels 130 is different. Accordingly, the system of the present exemplary embodiment does not suffer from the drawbacks of the conventional systems as described in the background section.

Figure 2:
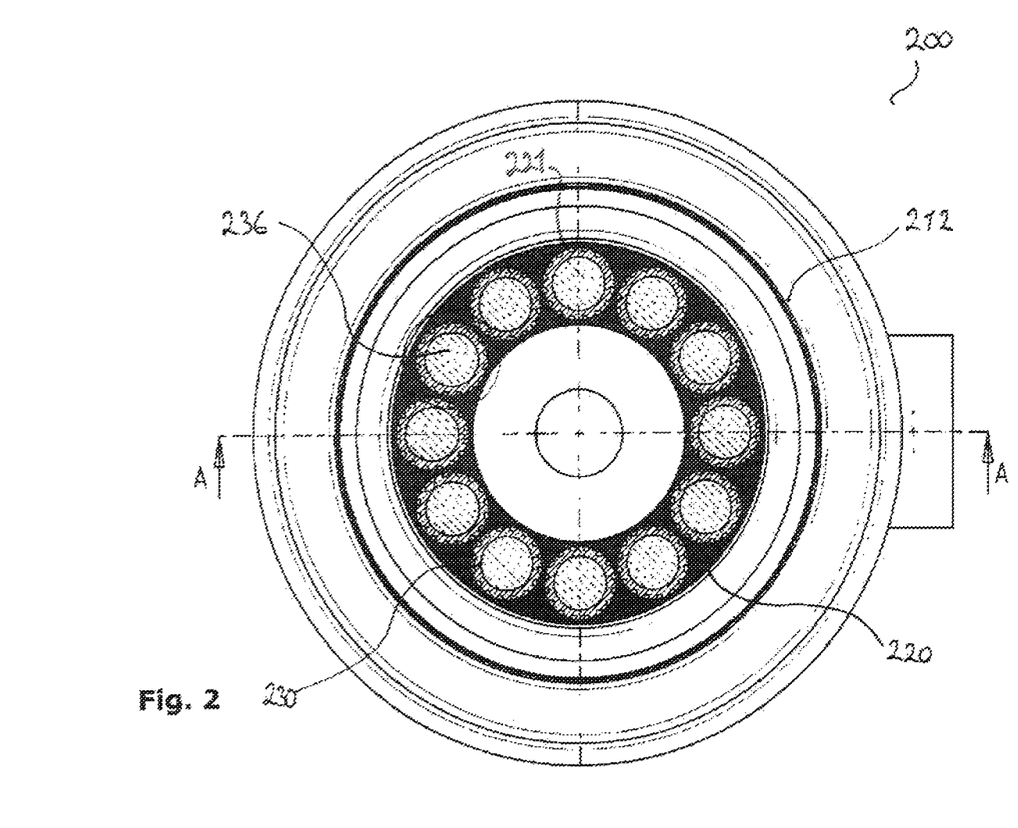
FIG. 2 shows an upper sectional view of the system in FIG. 1.

FIG. 2 shows an upper sectional view of the system 200 shown in FIG. 1. More specifically, FIG. 2 shows a sectional view in the direction indicated by arrows B in FIG. 1. Further, it should be noted that FIG. 1 shows a sectional view in the direction indicated by arrows A in FIG. 2. Under the dome 212, reaction vessels 230 containing samples 236 are arranged along a pitched circle in the vicinity of the outer periphery of base plate 220. The base plate 220 comprises through-holes 221 as discussed above.

Figure 3:
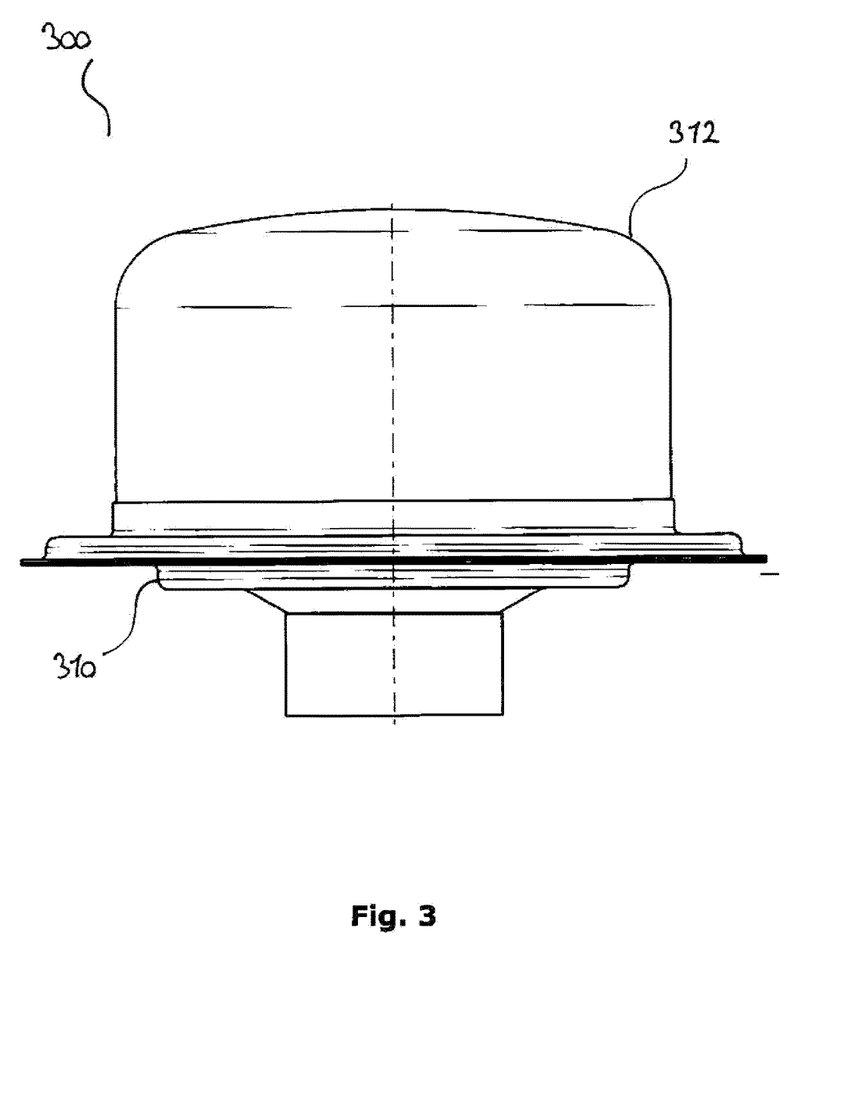
FIG. 3 shows a side view of the system of FIGS. 1 and 2.

FIG. 3 shows a side view of the system 300 shown in FIGS. 1 and 2. More specifically, FIG. 3 shows the system 300 in a closed state where the dome 312 is fastened to the bowl 310. As can be seen, both the bowl 310 and the dome 312 have substantially circular cross sections (ground views) that fit each other closely.

FIG. 4 shows an illustration of the distribution of microwave field intensity within the system shown in FIGS. 1 to 3. More specifically, FIG. 4 shows a partial view of the left-hand part of the system shown in FIG. 1. The various elements are all the same or similar, such that a repeated description thereof will be omitted. Due to the microwave attenuating properties of the metallic tubular members 422 and the metallic base plate 420, the microwave field intensity within the volume defined by the bowl 410 and dome 412 is divided into two main regions: a region 440 (densely hatched) of relatively high field intensity and a region 442 (coarsely hatched) of relatively low field intensity.

Figure 5:
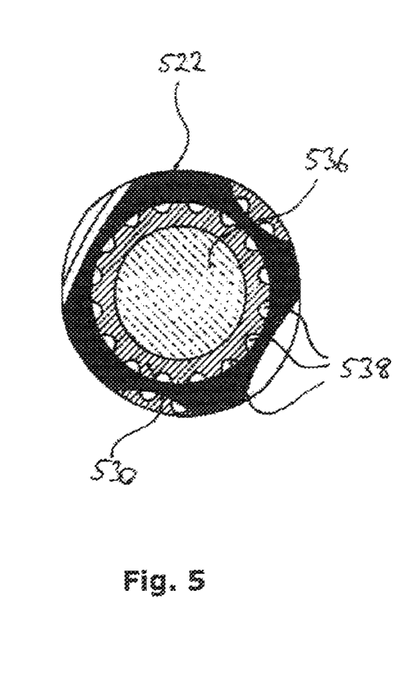
FIG. 5 shows a detailed view of one of the reaction vessels of the system shown in FIG. 2.

FIG. 5 shows a detailed view of one of the reaction vessels 530 of the system shown in FIG. 2. The vessel 530 is arranged within a metallic tubular member 522 and contains a sample 536. The outer surface of the vessel 530, i.e. the surface of the vessel 536 which faces the inner surface of the tubular member 522 has a toothed profile. Thereby, channels 538 are formed between the vessel 530 and the tubular member 522. These channels extend along a part of or the entire longitudinal extension of the vessel 530 and thereby allow air or another gas to move heat away from the vessel 530 during cooling of the vessel. Thereby, the efficiency of the cooling can be significantly improved.

It is noted that, unless otherwise indicated, the use of terms such as "upper", "lower", "left", and "right" refers solely to the orientation of the corresponding drawing.

It should be noted that the term "comprising" does not exclude other elements or steps and that the use of the articles "a" or "an" does not exclude a plurality. Also elements described in association with different exemplary embodiments may be combined.

The invention claimed is:

1. A microwave heating system, comprising
a bowl,
a dome adapted to be fit to the bowl, such that a volume is formed by the bowl and dome, and
a rotor device adapted to support at least one reaction vessel and being rotatably supported by the bowl, the rotor device comprising
a base plate comprising at least one through-hole, and
at least one tubular member having a longitudinal axis and being adapted to receive the at least one reaction vessel and to be coupled to the base plate in such a way that the longitudinal axis of the at least one tubular member passes through the at least one through-hole such that a portion of the at least one reaction vessel when present extends beyond the base plate,
wherein the base plate and the at least one tubular member comprise metal, and
wherein the bowl is adapted to be connected to a microwave generating unit, the microwave generating unit supplying a microwave field to the volume, the base plate and the at least one tubular member configured to attenuate the microwave field in a region between the rotor device and the dome and above a sample when present in the at least one reaction vessel within the at least one tubular member compared to a region between the bowl and the base plate of the rotor device, the microwave field propagating from the region between the bowl and the rotor device into the at least one tubular member and the at least one reaction vessel to heat the sample by microwave absorption.

2. The system according to claim 1, wherein the bowl and the dome have rotationally symmetric shapes.

3. The system according to claim 1, wherein the dome is moveably fastened to the bowl.

4. The system according to claim 1, further comprising a drive unit for rotating the rotor device.

5. The system according to claim 1, further comprising a sensor unit arranged in the region between the rotor device and the dome.

6. The system according to claim 1, wherein the rotor device further comprises a support element arranged at one side of the base plate, wherein the support element is microwave transparent.

7. The system according to claim 6, wherein the at least one tubular member is arranged on the side of the base plate opposite to the side at which the support element is arranged.

8. The system according to claim 1, wherein the base plate and the at least one tubular member are integrally formed.

9. The system according to claim 1, wherein the metal comprises aluminum, stainless steel and/or a nickel-based alloy.

10. The system according to claim 1, wherein the base plate and/or the at least one tubular member comprise an anticorrosive coating.

11. The system according to claim 1, wherein the at least one tubular member is adapted to attenuate microwave propagation within the tubular member.

12. The system according to claim 1, wherein a diameter of the at least one tubular member is between 10 mm and 50 mm.

13. The system according to claim 1, wherein the at least one through-hole is a plurality of through-holes, the at least one tubular member is a plurality of tubular members, and the longitudinal axis of each tubular member passes through one of the plurality of through-holes.

14. The system according to claim 13, wherein the plurality of through-holes comprises a first group of through-holes which are positioned in a vicinity of a periphery of the base plate.

15. The system according to claim 13, wherein the plurality of through-holes comprises a second group of through-holes which are positioned at a distance between a center of the base plate and a periphery of the base plate.

16. The system according to claim 1, wherein the at least one reaction vessel has a tubular body, wherein an outer portion of the tubular body has a tooth profile.

17. The system according to claim 16, wherein the tooth profile has one of square, rectangular, triangular, or rounded cross-sectional shape.

18. The system according to claim 1, wherein microwave radiation propagates within the at least one tubular member into the rest of the reaction vessel due to a dielectric property of the sample present in the at least one reaction vessel.

19. The system according to claim 1, wherein the base plate and the at least one tubular member are integrally formed.

20. The system according to claim 1, wherein the base plate and the at least one tubular member are physically and electrically coupled.

* * * * *